United States Patent
Hsieh et al.

(10) Patent No.: US 9,690,671 B2
(45) Date of Patent: Jun. 27, 2017

(54) MANIFEST-BASED SNAPSHOTS IN DISTRIBUTED COMPUTING ENVIRONMENTS

(71) Applicant: Cloudera, Inc., Palo Alto, CA (US)

(72) Inventors: Jonathan Ming-Cyn Hsieh, San Francisco, CA (US); Matteo Bertozzi, Palo Alto, CA (US)

(73) Assignee: Cloudera, Inc., Palo Alto, CA (US)

( * ) Notice: Subject to any disclaimer, the term of this patent is extended or adjusted under 35 U.S.C. 154(b) by 358 days.

(21) Appl. No.: 14/527,563

(22) Filed: Oct. 29, 2014

(65) Prior Publication Data

US 2015/0127608 A1    May 7, 2015

Related U.S. Application Data

(60) Provisional application No. 61/898,955, filed on Nov. 1, 2013.

(51) Int. Cl.
| | |
|---|---|
| G06F 7/00 | (2006.01) |
| G06F 17/00 | (2006.01) |
| G06F 11/14 | (2006.01) |
| G06F 17/30 | (2006.01) |

(52) U.S. Cl.
CPC .... G06F 11/1464 (2013.01); G06F 17/30575 (2013.01); *G06F 11/1456* (2013.01); *G06F 2201/84* (2013.01)

(58) Field of Classification Search
CPC . G06F 17/30088; G06F 2201/84; G06F 3/067
USPC ...................................................... 707/623
See application file for complete search history.

(56) References Cited

U.S. PATENT DOCUMENTS

| | | | |
|---|---|---|---|
| 5,325,522 A | 6/1994 | Vaughn | |
| 5,825,877 A | 10/1998 | Dan et al. | |
| 5,905,990 A * | 5/1999 | Inglett | ............... G06F 17/30067 |
| 6,542,930 B1 | 4/2003 | Auvenshine | |
| 6,553,476 B1 | 4/2003 | Ayaki et al. | |

(Continued)

OTHER PUBLICATIONS

Babaoglu, O., and K. Marzullo, "Consistent global states of distributed systems: Fundamental concepts and mechanisms," Distributed Systems, 53 pages, Jan. 1993.

(Continued)

*Primary Examiner* — Binh V Ho
(74) *Attorney, Agent, or Firm* — Perkins Coie LLP

(57) ABSTRACT

Scalable architectures, systems, and services are provided herein for creating manifest-based snapshots in distributed computing environments. In some embodiments, responsive to receiving a request to create a snapshot of a data object, a master node identifies multiple slave nodes on which a data object is stored in the cloud-computing platform and creates a snapshot manifest representing the snapshot of the data object. The snapshot manifest comprises a file including a listing of multiple file names in the snapshot manifest and reference information for locating the multiple files in the distributed database system. The snapshot can be created without disrupting I/O operations, e.g., in an online mode by various region servers as directed by the master node. Additionally, a log roll approach to creating the snapshot is also disclosed in which log files are marked. The replaying of log entries can reduce the probability of causal consistency in the snapshot.

22 Claims, 12 Drawing Sheets

(56) References Cited

U.S. PATENT DOCUMENTS

| | | |
|---|---|---|
| 6,651,242 B1 | 11/2003 | Hebbagodi et al. |
| 6,678,828 B1 | 1/2004 | Pham et al. |
| 6,687,847 B1 | 2/2004 | Aguilera et al. |
| 6,931,530 B2 | 8/2005 | Pham et al. |
| 7,031,981 B1 | 4/2006 | DeLuca et al. |
| 7,069,497 B1 | 6/2006 | Desai |
| 7,107,323 B2 | 9/2006 | Hara et al. |
| 7,120,572 B1* | 10/2006 | Liang ............... G06F 9/44589 703/13 |
| 7,143,288 B2 | 11/2006 | Pham et al. |
| 7,325,041 B2 | 1/2008 | Hara et al. |
| 7,392,421 B1 | 6/2008 | Bloomstein et al. |
| 7,487,228 B1 | 2/2009 | Preslan et al. |
| 7,496,829 B2 | 2/2009 | Rubin et al. |
| 7,620,698 B2 | 11/2009 | Hara et al. |
| 7,631,034 B1 | 12/2009 | Haustein et al. |
| 7,640,512 B1 | 12/2009 | Appling |
| 7,653,668 B1 | 1/2010 | Shelat et al. |
| 7,685,109 B1 | 3/2010 | Ransil et al. |
| 7,698,321 B2 | 4/2010 | Hackworth |
| 7,734,961 B2 | 6/2010 | Almoustafa et al. |
| 7,818,313 B1 | 10/2010 | Tsimelzon et al. |
| 7,831,991 B1 | 11/2010 | Kiraly |
| 7,937,482 B1 | 5/2011 | Vermeulen et al. |
| 7,970,861 B2 | 6/2011 | Simitci et al. |
| 7,984,043 B1 | 7/2011 | Waas |
| 8,024,560 B1 | 9/2011 | Alten |
| 8,069,267 B2 | 11/2011 | Powers-Boyle et al. |
| 8,108,338 B2 | 1/2012 | Castro et al. |
| 8,108,771 B2 | 1/2012 | Chijiiwa et al. |
| 8,306,919 B2 | 11/2012 | Sakamura et al. |
| 8,311,980 B2 | 11/2012 | Saito et al. |
| 8,468,244 B2 | 6/2013 | Redlich et al. |
| 8,484,716 B1 | 7/2013 | Hodgson et al. |
| 8,631,403 B2 | 1/2014 | Soundararajan et al. |
| 8,655,939 B2 | 2/2014 | Redlich et al. |
| 8,667,267 B1 | 3/2014 | Garcia et al. |
| 8,732,674 B1 | 5/2014 | Agha |
| 8,788,815 B1 | 7/2014 | Garcia et al. |
| 8,789,208 B1* | 7/2014 | Sundaram ............... H04L 29/06 726/28 |
| 8,821,602 B2 | 9/2014 | McAlister |
| 9,081,855 B1* | 7/2015 | Abeloe ............... G06F 17/3079 |
| 9,448,893 B1* | 9/2016 | Whitehead ........ G06F 17/30144 |
| 2002/0055989 A1 | 5/2002 | Stringer-Calvert et al. |
| 2002/0073322 A1 | 6/2002 | Park et al. |
| 2002/0138762 A1 | 9/2002 | Horne |
| 2002/0174194 A1 | 11/2002 | Mooney et al. |
| 2003/0051036 A1 | 3/2003 | Wang et al. |
| 2003/0055868 A1 | 3/2003 | Fletcher et al. |
| 2003/0093633 A1 | 5/2003 | Thiesfeld et al. |
| 2003/0101321 A1* | 5/2003 | Ohran ................. G06F 11/1451 711/162 |
| 2004/0003322 A1 | 1/2004 | Collins et al. |
| 2004/0059728 A1 | 3/2004 | Miller et al. |
| 2004/0103166 A1 | 5/2004 | Bae et al. |
| 2004/0172421 A1 | 9/2004 | Saito et al. |
| 2004/0186832 A1 | 9/2004 | Jardin |
| 2005/0044311 A1 | 2/2005 | Lahiri et al. |
| 2005/0071708 A1 | 3/2005 | Bartfai et al. |
| 2005/0091244 A1 | 4/2005 | Marcotte |
| 2005/0138111 A1 | 6/2005 | Aton et al. |
| 2005/0171983 A1 | 8/2005 | Deo et al. |
| 2005/0182749 A1 | 8/2005 | Matsui |
| 2005/0246397 A1* | 11/2005 | Edwards ............ G06F 17/30067 |
| 2006/0020854 A1 | 1/2006 | Cardona et al. |
| 2006/0050877 A1 | 3/2006 | Nakamura |
| 2006/0143453 A1 | 6/2006 | Imamoto et al. |
| 2006/0156018 A1 | 7/2006 | Lauer et al. |
| 2006/0224784 A1 | 10/2006 | Nishimoto et al. |
| 2006/0247897 A1 | 11/2006 | Lin |
| 2007/0067450 A1* | 3/2007 | Malloy ............... H04L 12/2602 709/224 |
| 2007/0100913 A1 | 5/2007 | Sumner et al. |
| 2007/0113188 A1 | 5/2007 | Bales et al. |
| 2007/0136442 A1 | 6/2007 | Palma et al. |
| 2007/0177737 A1 | 8/2007 | Jung et al. |
| 2007/0180255 A1 | 8/2007 | Hanada et al. |
| 2007/0186112 A1 | 8/2007 | Perlin et al. |
| 2007/0226488 A1 | 9/2007 | Lin et al. |
| 2007/0234115 A1 | 10/2007 | Saika |
| 2007/0255943 A1 | 11/2007 | Kern et al. |
| 2007/0282988 A1 | 12/2007 | Bornhoevd et al. |
| 2008/0104579 A1 | 5/2008 | Hartmann |
| 2008/0140630 A1 | 6/2008 | Sato et al. |
| 2008/0168135 A1 | 7/2008 | Redlich et al. |
| 2008/0244307 A1 | 10/2008 | Dasari et al. |
| 2008/0256486 A1 | 10/2008 | Hagiwara |
| 2008/0263006 A1 | 10/2008 | Wolber et al. |
| 2008/0276130 A1 | 11/2008 | Almoustafa et al. |
| 2008/0307181 A1 | 12/2008 | Kuszmaul et al. |
| 2009/0013029 A1 | 1/2009 | Childress et al. |
| 2009/0177697 A1 | 7/2009 | Gao et al. |
| 2009/0259838 A1 | 10/2009 | Lin |
| 2009/0307783 A1 | 12/2009 | Maeda et al. |
| 2010/0008509 A1 | 1/2010 | Matsushita et al. |
| 2010/0010968 A1 | 1/2010 | Redlich et al. |
| 2010/0011178 A1* | 1/2010 | Feathergill ........ G06F 11/1466 711/162 |
| 2010/0070769 A1 | 3/2010 | Shima et al. |
| 2010/0131817 A1 | 5/2010 | Kong et al. |
| 2010/0161556 A1* | 6/2010 | Anderson ............ G06F 17/3015 707/638 |
| 2010/0179855 A1 | 7/2010 | Chen et al. |
| 2010/0198972 A1 | 8/2010 | Umbehocker |
| 2010/0296652 A1 | 11/2010 | Nakayama et al. |
| 2010/0306286 A1* | 12/2010 | Chiu ....................... H04L 67/10 707/827 |
| 2010/0325713 A1 | 12/2010 | Kurita et al. |
| 2010/0332373 A1 | 12/2010 | Crabtree et al. |
| 2011/0055578 A1 | 3/2011 | Resch |
| 2011/0078549 A1 | 3/2011 | Thueringer et al. |
| 2011/0119328 A1 | 5/2011 | Simitci et al. |
| 2011/0179160 A1 | 7/2011 | Liu et al. |
| 2011/0228668 A1 | 9/2011 | Pillai et al. |
| 2011/0236873 A1 | 9/2011 | Bowers |
| 2011/0246816 A1 | 10/2011 | Hsieh et al. |
| 2011/0246826 A1 | 10/2011 | Hsieh et al. |
| 2011/0246964 A1* | 10/2011 | Cox, III ..................... G06F 8/71 717/122 |
| 2011/0276396 A1 | 11/2011 | Rathod |
| 2011/0276495 A1 | 11/2011 | Varadarajan et al. |
| 2011/0302417 A1 | 12/2011 | Whillock et al. |
| 2011/0307534 A1 | 12/2011 | Peng et al. |
| 2012/0036146 A1 | 2/2012 | Annapragada |
| 2012/0036357 A1 | 2/2012 | Struik |
| 2012/0054152 A1* | 3/2012 | Adkins ............ G06F 17/30371 707/623 |
| 2012/0102072 A1 | 4/2012 | Jia et al. |
| 2012/0130874 A1 | 5/2012 | Mane et al. |
| 2012/0131341 A1 | 5/2012 | Mane et al. |
| 2012/0150819 A1* | 6/2012 | Lindahl ............ G06F 17/30536 707/687 |
| 2012/0323854 A1* | 12/2012 | Schreter ............ G06F 17/30575 707/650 |
| 2013/0031240 A1 | 1/2013 | Byzek |
| 2013/0041872 A1 | 2/2013 | Aizman et al. |
| 2013/0054976 A1 | 2/2013 | Brown et al. |
| 2013/0085988 A1* | 4/2013 | Hiraguchi ......... G06F 17/30371 707/609 |
| 2013/0218840 A1 | 8/2013 | Smith et al. |
| 2013/0282650 A1* | 10/2013 | Zhang ............... G06F 17/30592 707/605 |
| 2013/0304761 A1 | 11/2013 | Redlich et al. |
| 2014/0188841 A1 | 7/2014 | Sun et al. |
| 2014/0195558 A1 | 7/2014 | Murthy et al. |
| 2014/0330784 A1* | 11/2014 | Sundaram ............... H04L 29/06 707/639 |

OTHER PUBLICATIONS

Canada Exam Report for application No. 2843459, mailing date Aug. 5, 2014, 3 pages.

(56) References Cited

OTHER PUBLICATIONS

Chapter 25: Distributed Databases ED—Ramez Elmasri; Shamkant B Navathe (eds), Jan. 1, 2011 (Jan. 1, 2011), Fundamentals of Database Systems (Sixth Edition), Addison-Wesley, pp. 877-927.
Cheng, Security Attack Safe Modle and Cloud-Based One-Time Password Tokens Using Rubbing Encryption Algorithm, ACM, Jun. 2011, pp. 304-336.
Corbett et al., "Spanner: Google's Globally Distributed Database," Transactions on Computer Systems (TOCS), vol. 31, No. 3, 14 pages, Aug. 2013.
Du et al., "A Pairwise Key Predistribution Scheme for Wireless Sensor Networks," ACM, May 2005, vol. 8 Issue 2, pp. 228-258.
European Search Report for European Application No. 14157984.7, mailing date Jun. 6, 2014, 10 pages.
Exam Report for GB1403929.1, Applicant: Cloudera, Inc, Mailed May 2, 2014, 6 pages.
Kim et al., Design and Implementation of a Private and Public Key Crypto Processor and Its Applicaiton to a Security System, IEEE, Feb. 2004, vol. %0, Issue 1, pp. 214-224.
Kossmann, Donald, "The State of the Art in Distributed Query Processing," ACM Computing Surveys, vol. 32, No. 4, Dec. 1, 2000, pp. 422-469.
Non-Final Office Action for U.S. Appl. No. 13/362,695, mailed Apr. 29, 2013, 23 pgs.
Stoller,S.D., "Detecting global predicates in distributed systems with clocks," Distributed Computing, vol. 13, No. 2, pp. 85-98, Feb. 2000.
Tamer Dzsu et al: "Principles of Distributed Database Systems", Principles of Distributed Database Systems, XX, XX, Jan. 1, 1991 (Jan. 1, 1991), pp. 74-93.
Beomseok Nam et al: "Spatial indexing of distributed multidimensional datasets", Cluster Computing and the Grid, 2005. CCGRID 2005. IEEE International Symposium on Cardiff~ Wales, UK May 9-12, 2005, Piscataway, NJ, USA,IEEE, Piscataway, NJ, USA, vol. 2, May 9, 2005, pp. 743-750.
Ko et al., "A Study of Encryption Algorithm for RFID tag (SEED: 8 Rounds X 64 bit block)," IEEE, 2008, pp. 672-677.
Lamport, L., "Time, clocks, and the ordering of events in a distributed system," *Communications of the ACM*, vol. 21, No. 7, pp. 558-565, Jul. 1978.

* cited by examiner

MANIFEST-BASED SNAPSHOTS IN DISTRIBUTED COMPUTING ENVIRONMENTS

CROSS REFERENCE TO RELATED APPLICATION

This application claims benefit of and priority to U.S. Provisional Patent Application No. 61/898,955 entitled "SNAPSHOTS WITH CAUSAL CONSISTENCY FOR EXPORTING, CLONING AND RESTORING DISTRIBUTED DATA," filed on Nov. 1, 2013, the contents of which are incorporated by reference herein.

BACKGROUND

The Apache Hadoop project (hereinafter "Hadoop") is an open-source software framework for developing software for reliable, scalable and distributed processing of large data sets across clusters of commodity machines. A Hadoop cluster typically comprises a name node and multiple data nodes. Hadoop implements a distributed file system, known as Hadoop Distributed File System (HDFS). HDFS provides a unified file system for the cluster, with the name node managing the name space of the unified file system, by linking together file systems on the data nodes. Hadoop also includes a MapReduce function that provides a programming framework for job scheduling and cluster resource management.

Hadoop is supplemented by other Apache projects, including Apache Zookeeper (hereinafter "Zookeeper") and Apache HBase (hereinafter "HBase"). ZooKeeper is a centralized service for maintaining configuration information and naming. ZooKeeper also provides distributed synchronization and group services. HBase is a scalable, distributed Not-only Structured Query Language (Not-only SQL) or No Structured Query Language (NoSQL) database or data store that supports structured storage of large tables. Generally, an HBase installation includes a region server associated with each of the data nodes and depends on a ZooKeeper to coordinate the region servers. Each of the region servers works with data files called HFiles underlying the large tables, write ahead logs called HLogs, and other metadata in a data directory on the data node.

HBase supports several approaches of batch backups. One approach requires three MapReduce jobs, first to dump each table on a source cluster into a sequence file (export), second to copy a directory of files from the source cluster to a target cluster (dist cp), and third to save a sequence file into a table on the target cluster (import). Another approach requires one MapReduce job to read data from one table on a source cluster and write the data to another table on a target cluster (copy table). Unfortunately, these approaches all involve the execution of table manipulation commands that incur high latency and substantially impact existing workloads. Accordingly, it would be beneficial to have a more efficient approach for backup and related purposes, such as cloning and restoration.

DETAILED DESCRIPTION

Figure 1:
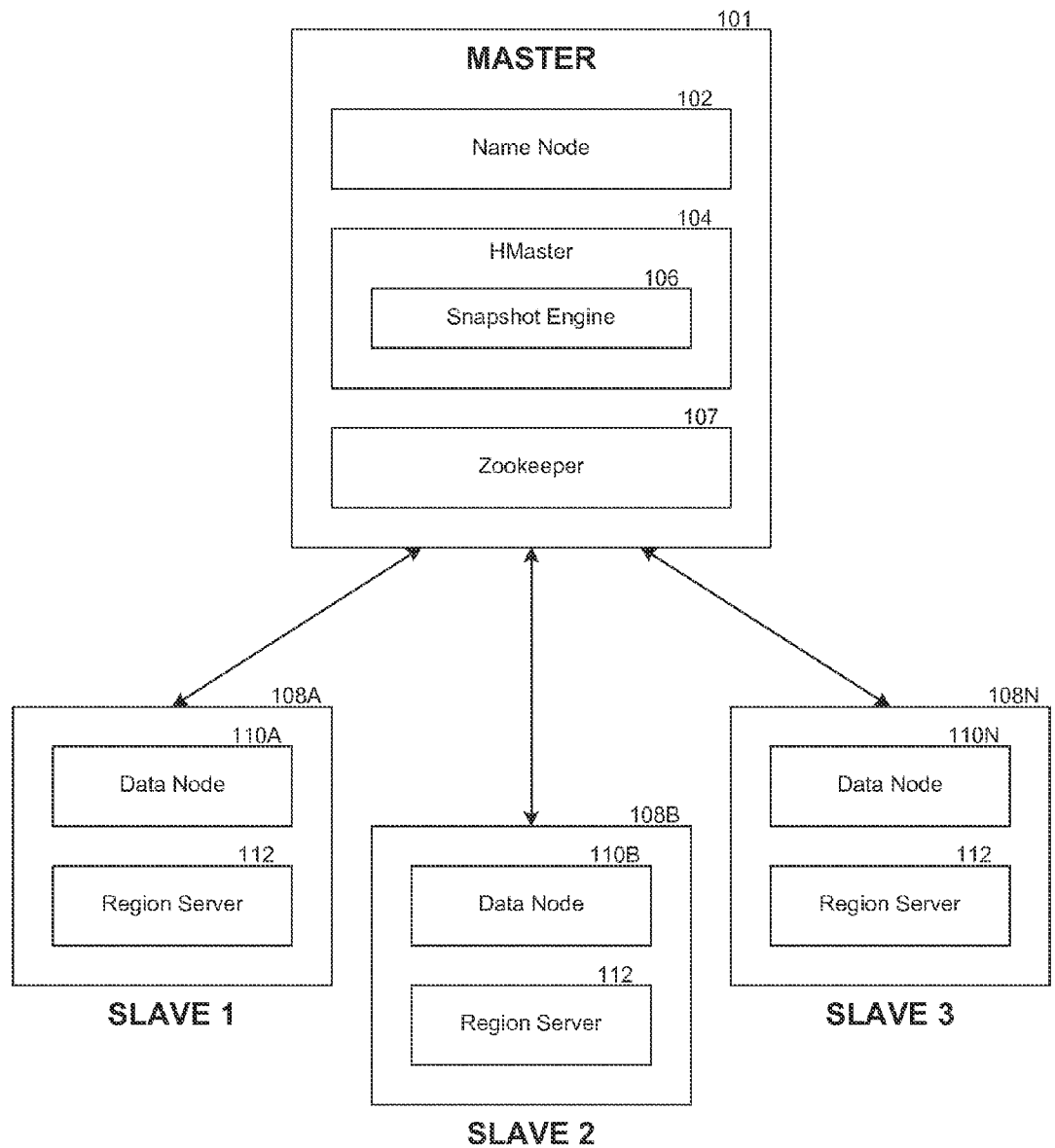
FIG. 1 contains a diagram illustrating an example environment in which a snapshot engine may be deployed.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment and such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but no other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

As referred to herein, snapshot is a collection of metadata required to reconstitute the data near a particular point in time. Embodiments of the present disclosure include an HBase-based snapshot engine for Hadoop. Embodiments of the present disclosure further describe systems and methods for managing snapshots, as well as exporting, cloning and restoring cluster data using the snapshots to recover from user errors and bootstrap data replication.

Among other benefits, the technologies disclosed in this application enable efficient and effective data management for a distributed, cloud computing environment. For example, the creation, maintenance and usage of snapshots facilitate export, cloning, restoration and other data operations to increase data quality and availability with minimal impact on existing workloads.

Additionally, technology is disclosed for creating manifest-based snapshots in distributed computing environments. In some embodiments, responsive to receiving a request to create a snapshot of a data object, a master node identifies multiple slave nodes on which a data object is stored in the cloud-computing platform and creates a snapshot manifest representing the snapshot of the data object. The snapshot manifest comprises a file including a listing of multiple file names in the snapshot manifest and reference information for locating the multiple files in the distributed database system. The snapshot can be created without disrupting I/O operations, e.g., in an online mode by various region servers as directed by the master node. Additionally, a log roll approach to creating the snapshot is also disclosed in which log files are marked. Replaying of log entries ensures causal consistency in the snapshot.

FIG. 1 contains a diagram illustrating an example environment in which a snapshot engine may be deployed. In one embodiment, the environment includes a Hadoop cluster having a master machine 101 and multiple slave machines 108A-N. As part of the HBase installation, the master machine may run the name node 102, an HBase HMaster 104 and a Zookeeper server 107. Likewise, the slave machines 108A-N may run data nodes 110A-N and an HBase region server 112A-N, respectively. As illustrated in the example of FIG. 1, the HMaster 104 supports a snapshot engine 106. It is appreciated that the system can operate as described herein with any number of slaves, as few as one slave.

As discussed above, Hadoop implements a distributed file system, known as Hadoop Distributed File System (HDFS). HDFS provides a unified file system for the cluster, with the name node managing the name space of the unified file system, by linking together file systems on the data nodes.

As described herein, the distributed file system can logically be described as including the name node and the data nodes.

Figure 2:
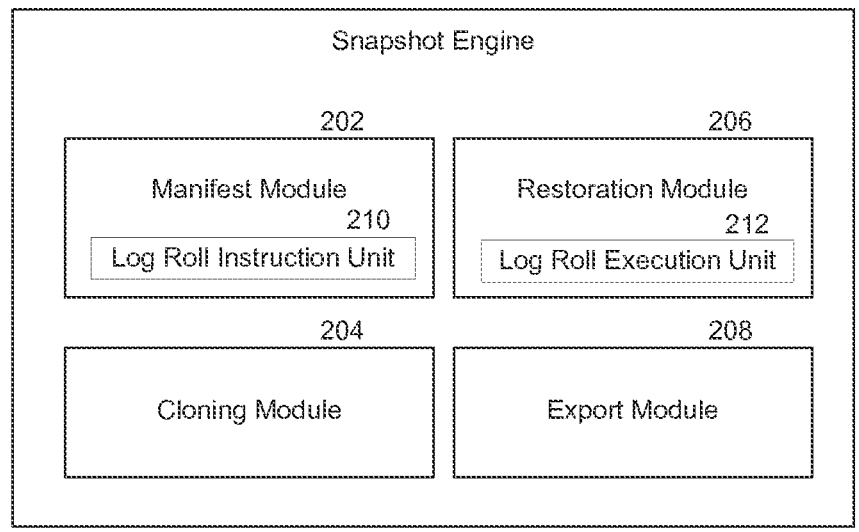
FIG. 2 is a block diagram illustrating example components of a snapshot engine.

FIG. 2 contains a block diagram illustrating example components of the snapshot engine. In one embodiment, the snapshot engine comprises a manifest module 202, a cloning module 20.4 a restoration module 206 and an export module 208. The manifest module 202 manages a snapshot for a table, including creation and modification. The cloning module 204 handles cloning a table or creating an additional handle to the table using a snapshot for the table. The restoration module 206 handles restoring a table to a previous state using a snapshot for the table. The export module 208 handles exporting a table from one cluster to another.

Figure 3:
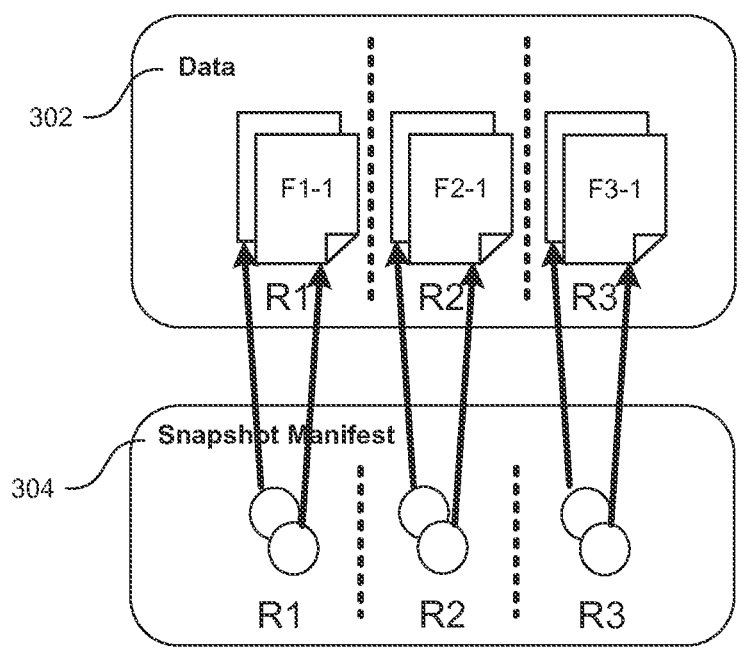
FIG. 3 is a diagram illustrating an example snapshot for a table.

FIG. 3 contains a diagram illustrating an example snapshot for a data object, e.g., a table. HBase can represent changes to data existing in the distributed file system as addendums without modifying the existing data. In the example of FIG. 3, data 302 represents data stored on the distributed file system. More specifically, the data 302 represents the data stored on several name nodes corresponding to a table of several regions, including R1, R2, and R3. For example, HFiles including F1-1 and any addenda (e.g., F1-2-F1-$n$) would be considered to be in the region R1, HFiles including F21 and any addenda would be considered to be in the region R2, and Hfiles including F31 and any addenda would be considered to be in the region R3. The manifest module 202 of FIG. 2 directs each of the respective region servers associated with the data nodes to create a snapshot manifest 304 representing a portion of the snapshot manifest, e.g., fsnapshot, of a region of the table and save that portion in a snapshot directory, for example, on the name node. The snapshot manifest 304 contains the name of those HFiles and a reference to the I-Wile, which enables the retrieval of the HFile. When each of the portions of the snapshot manifest 304 are successfully saved in the snapshot directory, the manifest module 202 may move the snapshot directory to make it available for clone/restore operations.

Figure 4A:
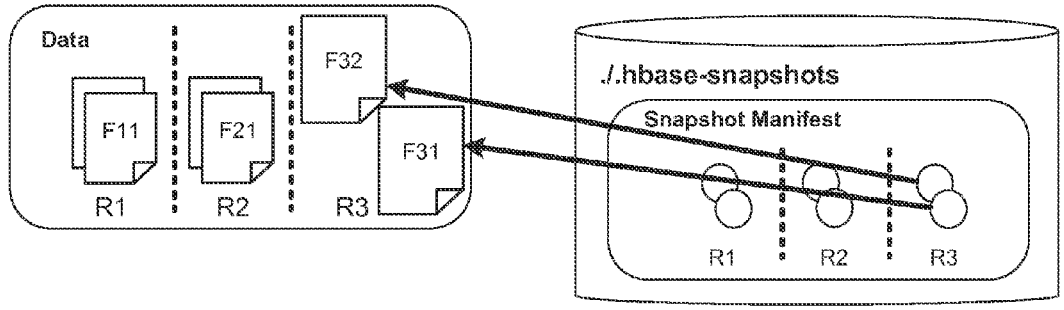
FIGS. 4A-4C illustrate an example process in which a snapshot manifest is updated.
Figure 4B:
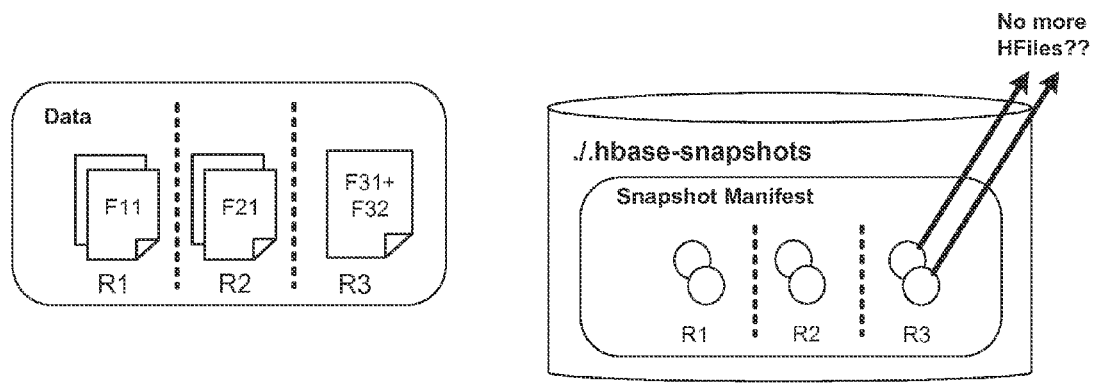
Figure 4C:
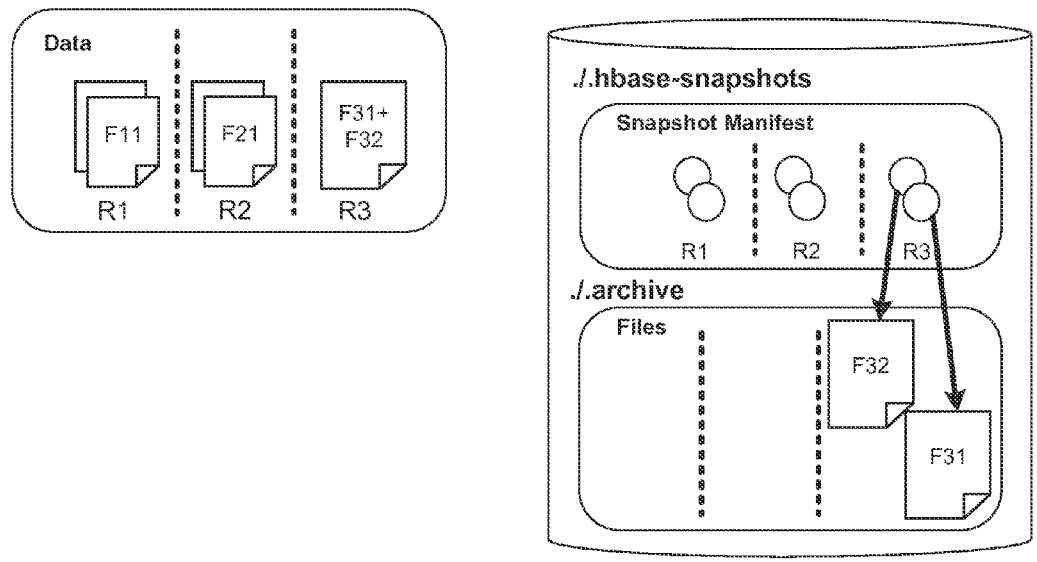

FIGS. 4A-4C illustrate an example process in depicting updating of a snapshot manifest, according to an embodiment. Generally, HBase does not modify an HFile except that it may merge the HFile with another HFile or split the HFile into two HFiles, In FIG. 4A, a snapshot originally contains references to the HFile F31 and an addendum F32 in the region R3, in FIG. 4B, it may be determined that the addendum F32 should be merged into the HFile F31, which would, however, break the references in the snapshot manifest invalidating the snapshot. In FIG. 4C, to preserve the validity of the snapshot, the manifest module 202 creates copies of the HFile F31 and the addendum F32 and saves them in an archive directory, for example, on the name node, typically before the merge takes place. The manifest module 202 also updates the snapshot manifest to replace the references to the original HFile F31 and the addendum F32 in the region R3 by references to the new HFile F31 and addendum F32, Similarly, when an HFile is split into two, the manifest module 202 would create a copy of the original HFile and save it in the archive directory, it would also update the snapshot manifest to replace the reference to the original HFile by references to the two new HFiles.

The manifest module 202 may create a snapshot at any time or according to any predetermined schedule. As one example, it may create a snapshot periodically. As another example, it may create a snapshot when a sufficient amount of new data is created on the data notes. In certain embodiments, the manifest module 202 may create a snapshot in an offline mode or an online mode. In the offline mode, the manifest module 202 would disable access to a table, examine the file system namespace to determine which HFiles form the table, and create the manifest. In the online mode, the manifest module 202 would communicate with each of the region servers in turn to capture the state of the data in real time. In one embodiment, in response to the communication, a region server would flush the data currently in memory into the table, and the manifest module 202 would include references to the HFiles created by the region server. In the offline mode, the snapshot for a table would be a true reflection of the table at a point in time. In the online mode, however, that may not he the case, as will be discussed in detail later.

Among other features, a snapshot enables easy backup of data at a particular point in time. In one embodiment, the export module 208 submits a MapReduce job for a table to copy all the corresponding HFiles, HLogs, and other related data in the data directories on the data nodes, the snapshot manifest for the table in the snapshot directory, and the table metadata on the name node, from a source cluster to a target cluster, which may have any number of data nodes. The table metadata contains information on how the HBase tables are mapped to the file system on the target cluster. The table metadata also contains settings about how the data is stored (compressed, encoded, etc.) on the target cluster. This process bypasses normal table manipulation commands and entails low-latency workloads.

Figure 5A:
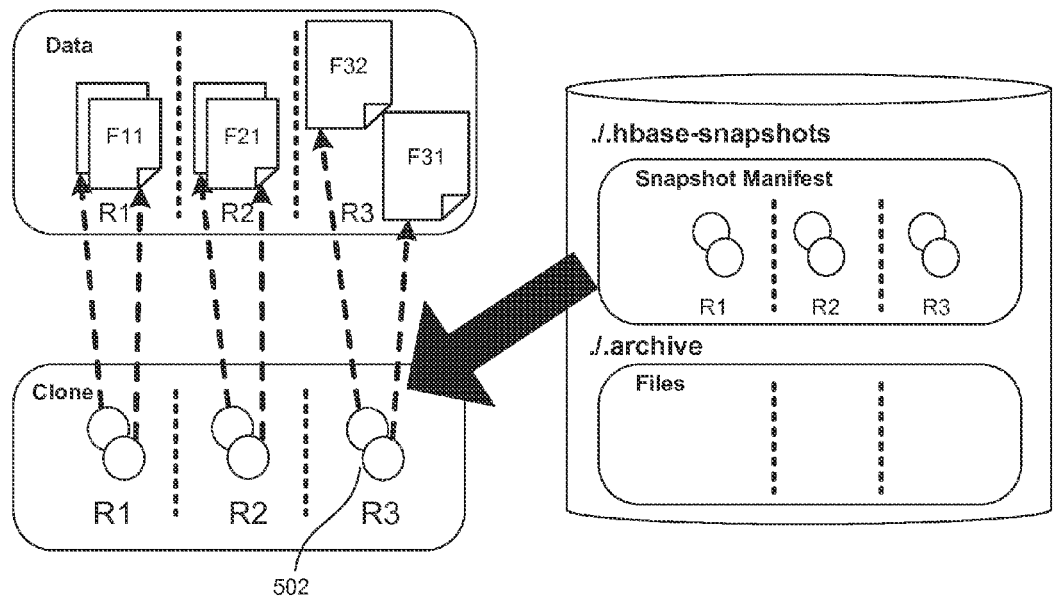
FIGS. 5A and 5B illustrate an example process of cloning a table from a snapshot.
Figure 5B:
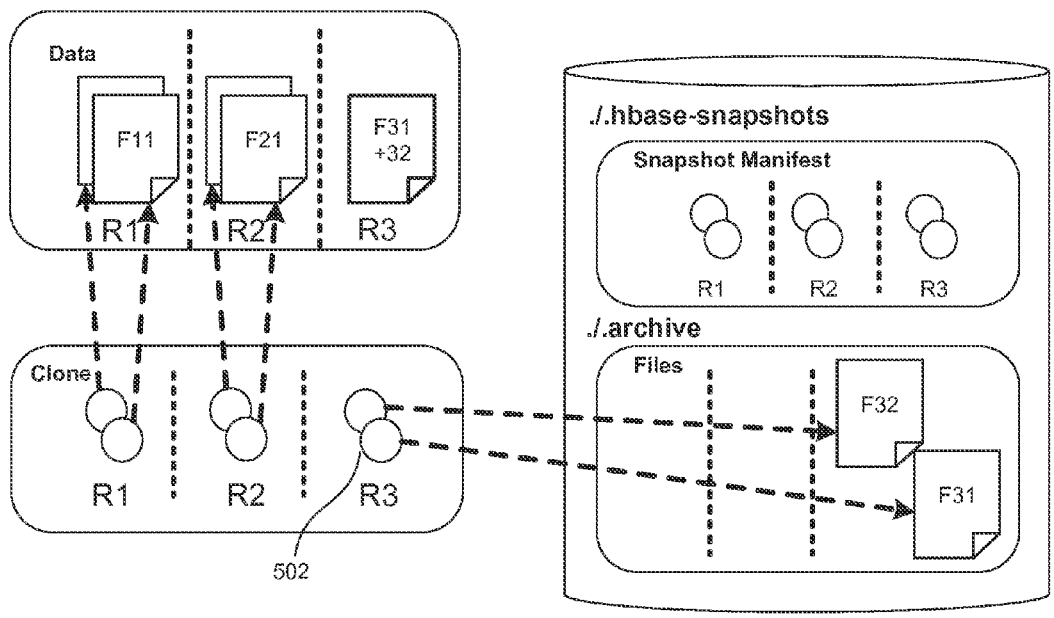

It is possible to clone a table based on a snapshot for the table. FIGS. 5A and 5B illustrate an example process of cloning a table from a snapshot. In FIG. 5A, the cloning module 204 first creates a copy of the table metadata. It then "copies" the relevant HFiles on each data node according to the snapshot into a new directory on the data node corresponding to the name of the newly cloned table. However, each copy of a relevant HFile would not contain actual data but would constitute a link to the corresponding HFile, which basically never changes. For example, the newly created HFiles 502 in the region R3 are links to the original HFiles F31 and F32. A link is different from a reference contained in a snapshot manifest, though, in that a link would not break even as the actual data is moved. In FIG. 5B, even if the addendum F32 has been merged into the HFile F31 and, as a result, these I-Wiles have effectively been moved to the archive directory on the name node, the newly created HFiles 502 would remain valid by linking to the HFiles F31 and F32 in the archive directory instead.

Figure 6A:
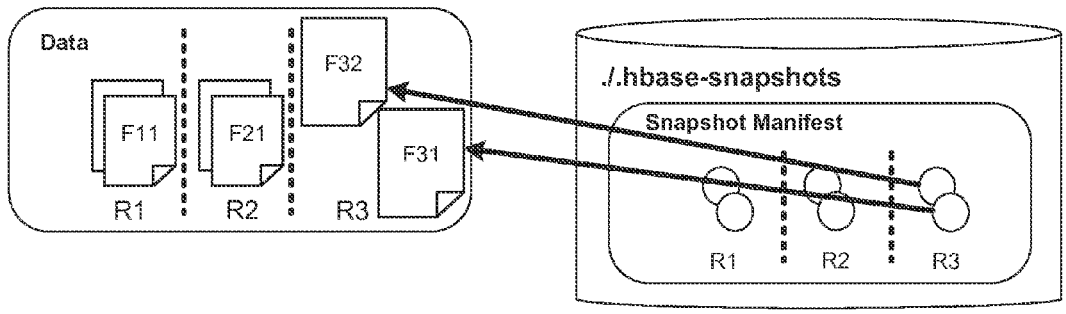
FIGS. 6A-6E are diagrams illustrating an example process of restoring a table using a snapshot.
Figure 6B:
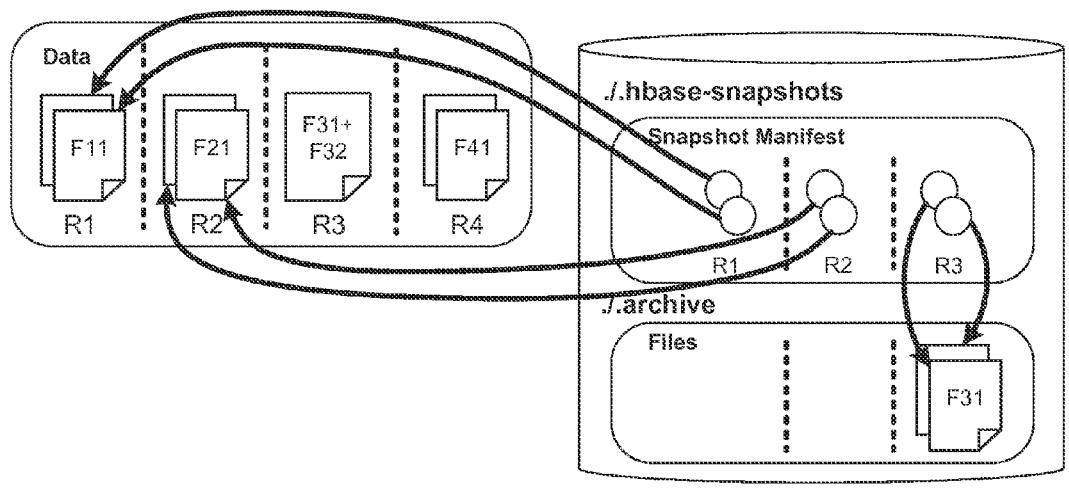
Figure 6C:
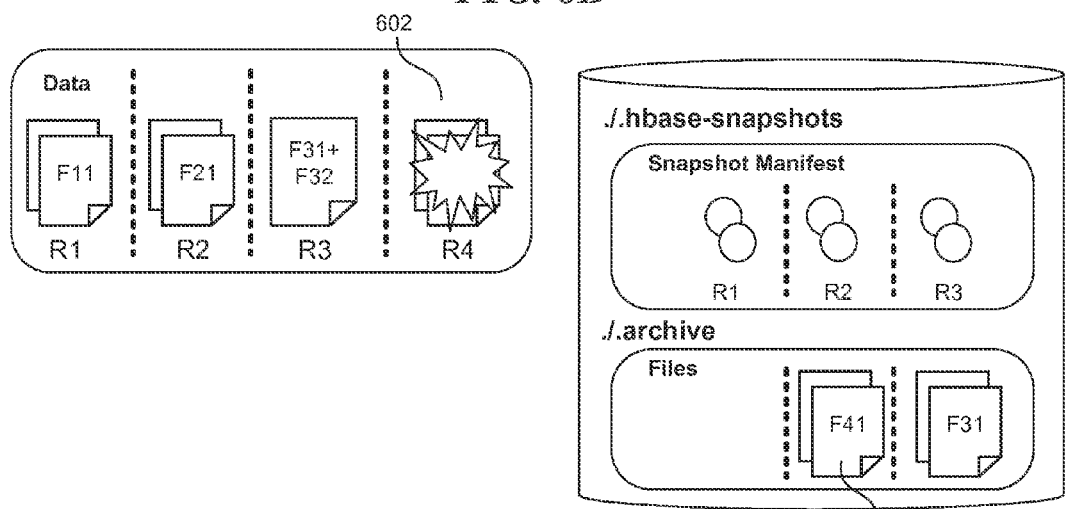
Figure 6D:
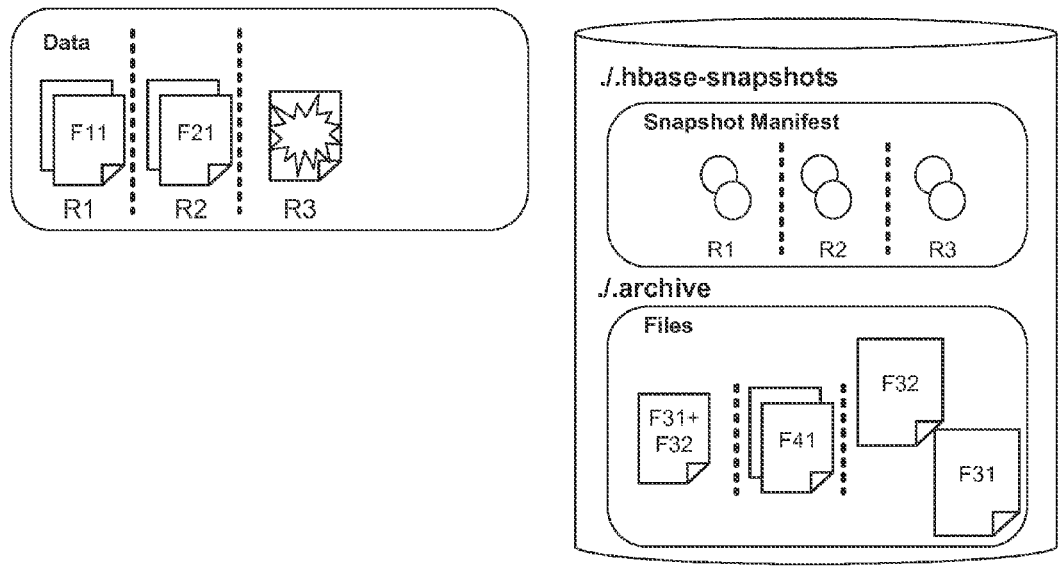
Figure 6E:
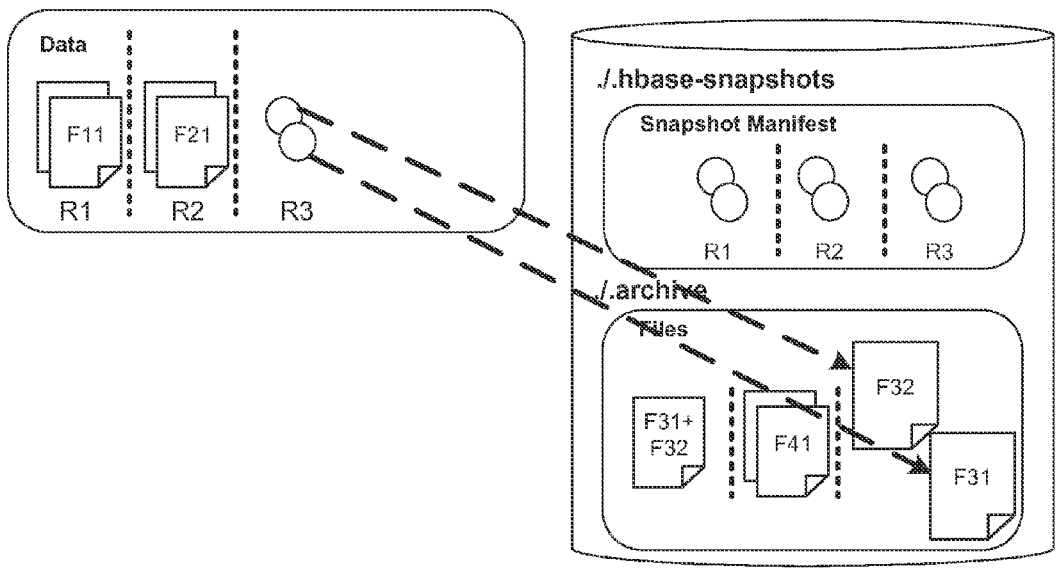

With a snapshot available, it is also possible to rollback a table to a previous state. FIG. 6 contains five diagrams FIGS. 6A-6E illustrating an example process of restoring a table according to a snapshot. FIG. 6A shows the data when the snapshot was taken, while FIG. 6B shows the data at present. In one embodiment, to restore the table back to how it was when the snapshot was taken, the restoration module 206 disables access to the table and compares the snapshot with the table at present. In FIG. 6C, upon determining that the HFiles in the region R4 were not present back then, the restoration module 206 requests that the appropriate region server updates the appropriate table to remove those HFiles with 602 but saves copies of those HFiles in the archive directory on the name node with 604. In FIG. 6D, upon determining that the HFiles in the region R3, including the combination of the HFiles F31 and F32, were not present back then, the restoration module 206 takes similar actions. In FIG. 6E, upon determining that copies of those HFiles that were in the region R3 back then are saved in the archive directory on the name node, the restoration module 206 requests that the appropriate region server creates HFiles that constitute links to those copies in the archive directory.

It is possible that the restoration fails due to network issues, server issues, etc. In one embodiment, the restoration module 206 will restart the restoration process.

To create a snapshot in the online mode, the manifest module 202 would contact the region servers at slightly different times, which then each capture a part of a table in real time. The difference in times is typically very small, in the order of 10 to 20 seconds. However, it is theoretically possible to have inconsistency in the captured data.

Figure 7A:
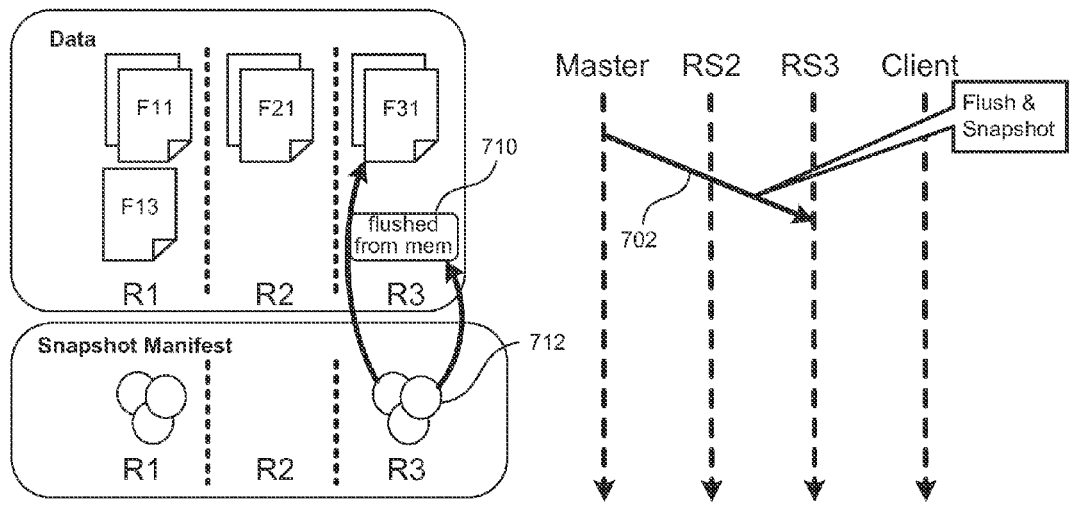
FIGS. 7A-7C are diagrams illustrating an example process in which creating a snapshot an online mode results in causal inconsistency.
Figure 7B:
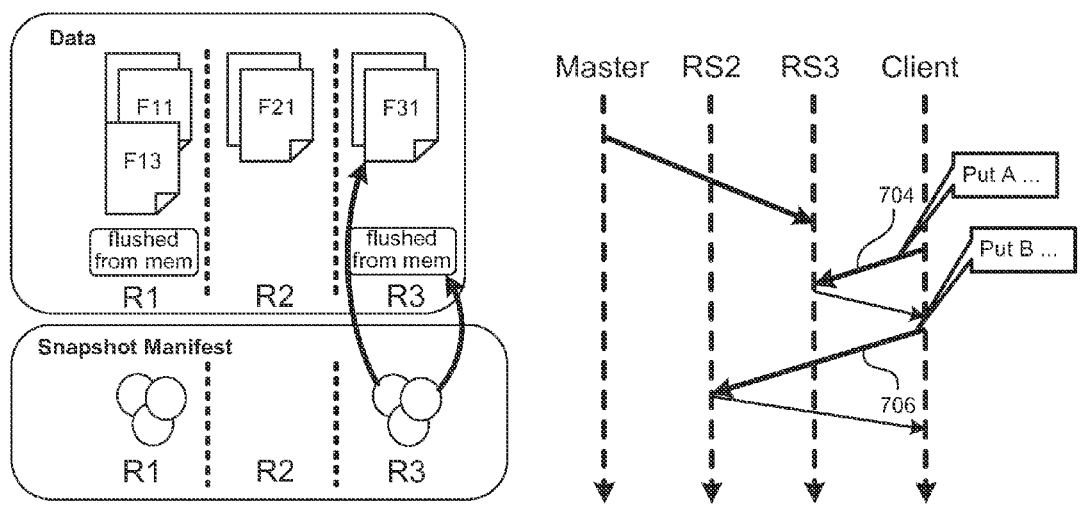
Figure 7C:
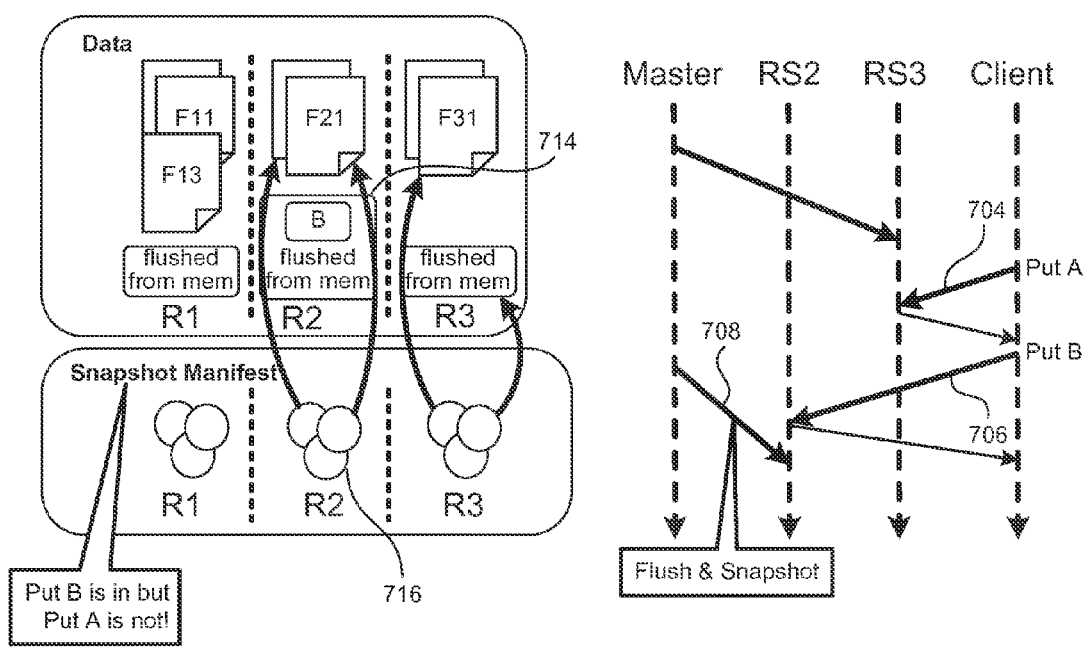

FIGS. 7A-7C illustrate an example depicting creation of a snapshot in the online mode which may result in causal inconsistency. In FIG. 7A, with 702, the name node requests that the region server RS3 perform a memory flush, following which the name node builds the snapshot for the part of the table in the region R3. As a result, that part of the table now contains additional data 710 flushed out from the memory, and the snapshot contains references 712 to the HFiles which form that part of the table. In FIG. 7B, with 704, the region server RS3 inputs data A to the memory and with 706, the region server RS2 inputs data B which is related to data A to the memory, upon client requests. In FIG. 7C, with 708, the name node finally requests that the region server RS2 perform a memory flush, following which the name node builds the snapshot for the part of the table in the region R2. As a result, that part of the table now contains additional data 714 flushed out from the memory, which includes the data B, and the snapshot contains references 716 to the HFiles which form that part of the table. As can be seen, however, at this point in time, both data A and data B have been input, but only data B is accounted for in the snapshot, leading to causal inconsistency.

To reduce such causal inconsistencies for restoration purposes, in one embodiment, to establish a snapshot for a table, the snapshot module 202 may request that each region server enhance the HLogs. In response to the request, each region server would add an entry to an HLog for a memory flush. Next, it would place a marker in the HLog, by rolling or terminating the HLog and starting a separate one, for example, to indicate the taking of the snapshot. As adding one or two entries to a log takes very little time, at least compared to flushing data in a memory to a table, the snapshot module 202 may quickly move from one region server to the next, and all the markers would be placed in the respective logs at about the same time.

When it is time to restore the table according to the snapshot, the restoration module 206 would first clear the table. Next, it would replay the HLogs or reenact the log entries, such as adding a piece of data to memory or flushing it to the table up to where a marker is placed. With these log roll approaches, all the events up to a single point in time would be accounted for, ensuring causal consistency.

Figure 8A:
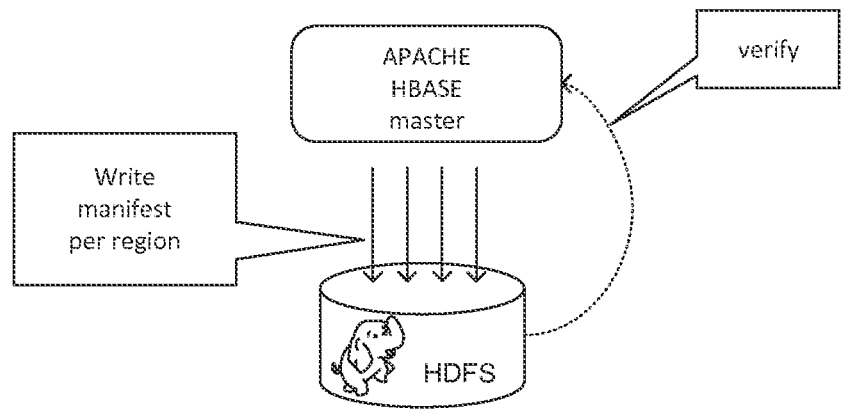
FIGS. 8A-8B are diagrams illustrating various components of a distributed cloud-computing platform involved in offline and online creation of a manifest-based snapshot of a data object in the distributed cloud-computing platform, respectively.
Figure 8B:
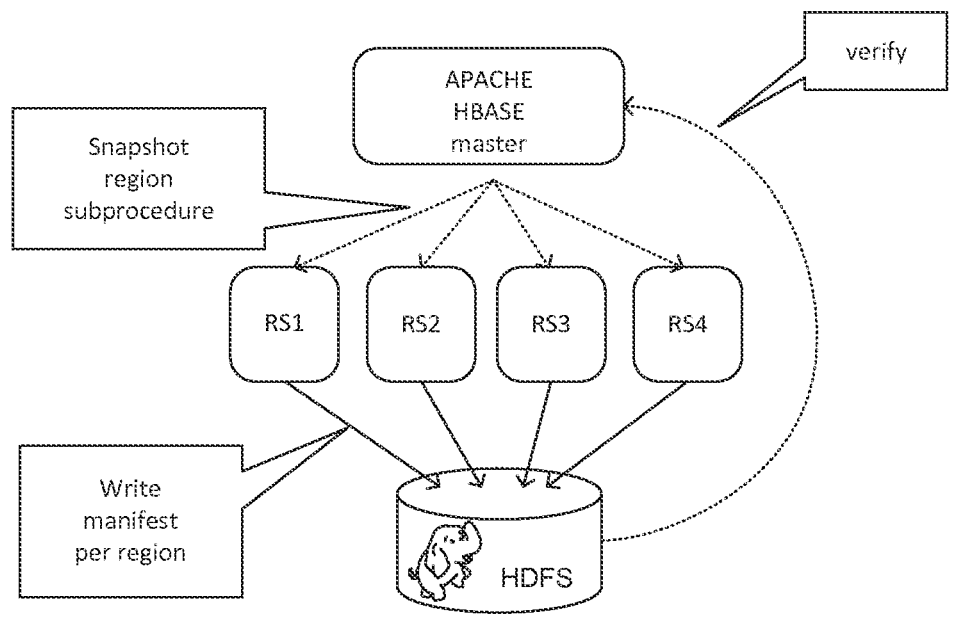

FIGS. 8A-8B are diagrams illustrating various components of a distributed cloud-computing platform involved in creation of a manifest-based snapshot of a data object in the distributed cloud-computing platform. More specifically, FIG. 8A illustrates offline creation of a manifest-based snapshot of a data object in the distributed cloud-computing platform and FIG. 8B illustrates online creation of a manifest-based snapshot of a data object in the distributed cloud-computing platform, according to an embodiment. In the examples of FIGS. 8A-8B, the distributed cloud-computing platform is a Hadoop framework, although alternative configurations are possible.

Referring first to the example of FIG. 8A, when an Apache HBase master receives a request to create a manifest-based snapshot of a data object in the distributed cloud-computing platform the Apache HBase master creates the snapshot. As discussed above, in order to create a snapshot, the Apache HBase master typically creates one empty file for each file in a source table directory and copies region information corresponding to each compute region, e.g., a .regioninfo file for each region. Additionally, the Apache HBase master also copies a table descriptor file and a snapshot file, e.g., snapshotInfo file. However, as described herein, the Apache HBase master advantageously generates a manifest file (or H-file) that contains a list of the files in the manifest. In some embodiments, the Apache HBase master may create one manifest file per region. Alternatively or additionally, in some embodiments, the Apache HBase master may create one manifest file per region server or slare-gionve.

For instance, in the offline snapshot of example of FIG. 8A, the Apache HBase master writes a snapshot manifest per region and subsequently verifies the snapshot files. The verification process can include traversing the filesystem, e.g., fs.listStatus( ) and accessing the .regioninfo files to obtain the relevant information for the snapshot (e.g., file names and/or location information). Advantageously, the use of the manifest file(s) (or H-file(s)) that contain lists of files reduce utilization of the NameNode during snapshot and/or restore operations.

The example of FIG. 8B is similar to the example of FIG. 8A in the use of manifest file(s) (or H-file(s)). However, FIG. 8B illustrates an example online snapshot operation whereby region servers RS1-RS4 are each directed by the Apache HBase master to create the manifest files for data stored on corresponding data nodes (not shown). Again, as illustrated in FIG. 1, each slave node can include a region server and a data node. As shown in the example of FIG. 8B, the Apache HBase master directs and/or otherwise requests the regions servers RS1-RS4 to write the manifests via snapshot region subprocedures that are generated by the Apache HBase master and sent to each region server. The example of FIG. 8B includes four region servers, although it is appreciated that the distributed cloud-computing platform could include any number of region servers.

As described herein, creation of a snapshot while online allows the distributed database system to continue to accept I/O requests, e.g., reads and/or writes from clients during creation of the snapshot.

Figure 9:
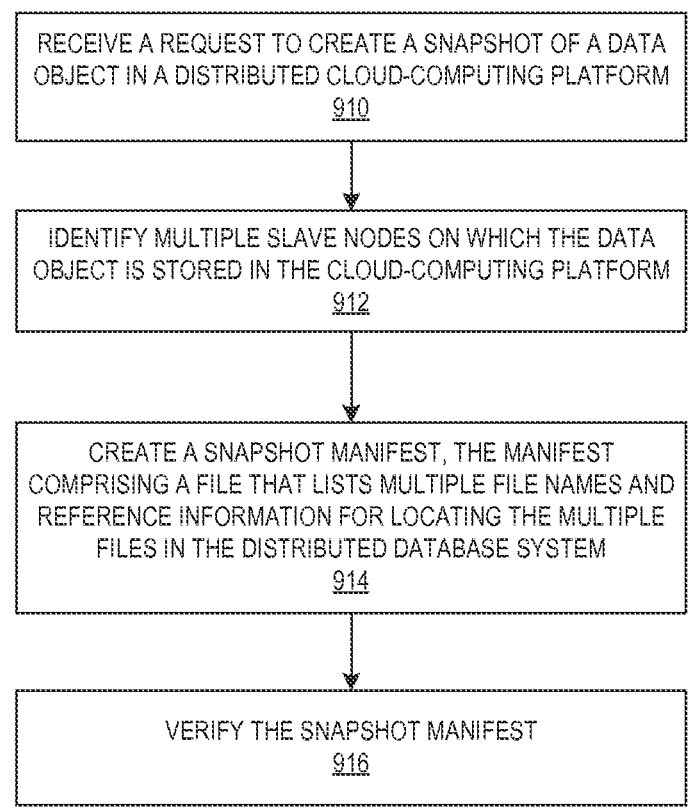
FIG. 9 is a flow diagram illustrating creation of a manifest-based snapshot of a data object in a distributed cloud-computing platform, according to an embodiment.

FIG. 9 is a flow diagram illustrating a set of operations 900 for creation of a manifest-based snapshot of a data object in a distributed cloud-computing platform, according to an embodiment. More specifically, the set of operations 900 illustrate example creation of a manifest-based snapshot. A master machine (or master node) such as, for example, master machine 101 of FIG. 1 can, among other functions, perform the set of operations 900.

To begin, at operation 910, the master machine receives a request to create a snapshot of a data object in a distributed cloud-computing platform. The request can be generated internally responsive to some automated and/or periodic triggering, manually by an administer, by an external system, or in any other possible way known in the art.

At operation 912, the master machine identifies multiple slave nodes on which the data object is stored in the cloud-computing platform. As discussed herein, the distributed database system includes the master node and the multiple slave nodes. In some embodiments, each slave node implements a region server and includes a data node associated with the region server. In some embodiments, the data object is stored in partitions on multiple of the data nodes.

At operation 914, the master machine creates a snapshot manifest. As described herein, the manifest can include a file that lists multiple file names and/or reference information for locating the multiple files in the distributed database system. In some embodiments, the creation of the snapshot manifest can include directing, by the master machine, each region server to create a portion of the snapshot manifest corresponding to the partition of the data on the data node with which the region server is associated. In some embodiments, each portion of the snapshot manifest represents a single computing region. In some embodiments, each portion of the snapshot manifest comprises a single file including a listing of multiple file names in the portion of the snapshot manifest and reference information for locating the multiple files on corresponding data nodes.

In some embodiments, directing each region server to create the portion of the snapshot manifest corresponding to the partition of the data on the data node can further comprise requesting that the region server flush memory prior to creation of the portion of the snapshot manifest. In some embodiments, directing each region server to create the portion of the snapshot manifest corresponding to the partition of the data on the data node can further comprise directing each region server to drop a marker in a log file indicating a position of the log file associated with the snapshot manifest.

In some embodiments, directing each region server to create the portion of the snapshot manifest corresponding to the partition of the data on the data node with which the region server is associated includes generating, by the master node, a request to each region server for the respective portions of the snapshot manifest corresponding to the partition of the data on the data node with which the region servers are associated, and sending the requests to the corresponding region servers. The requests may be the snapshot region subprocedures discussed with reference to FIG. 8B.

In some embodiments, the master machine (or machine on which HDFS is controlled, e.g., NameNode) receives the respective portions of the snapshot manifest from the slave nodes and combines the respective portions of the snapshot manifest to form the snapshot manifest. This can include aggregating the portions of the snapshot manifest received from each of the slave nodes. Alternatively, these portions can be combined into a single file.

Lastly, at operation 916, the master machine verifies the snapshot manifest. For example, the master machine can traverse the files to verify that the snapshot is successfully created as discussed with reference to FIGS. 8A-8B. In some embodiments, the distributed database system continues to accept reads and writes from clients during creation of the snapshot, e.g., online mode.

As discussed herein, in some embodiments, the distributed cloud-computing platform is a Hadoop framework. In such cases, the master node can be an HBase master node, the slave nodes can be HBase slave nodes, and/or the data object can be a Hadoop table.

Figure 10:
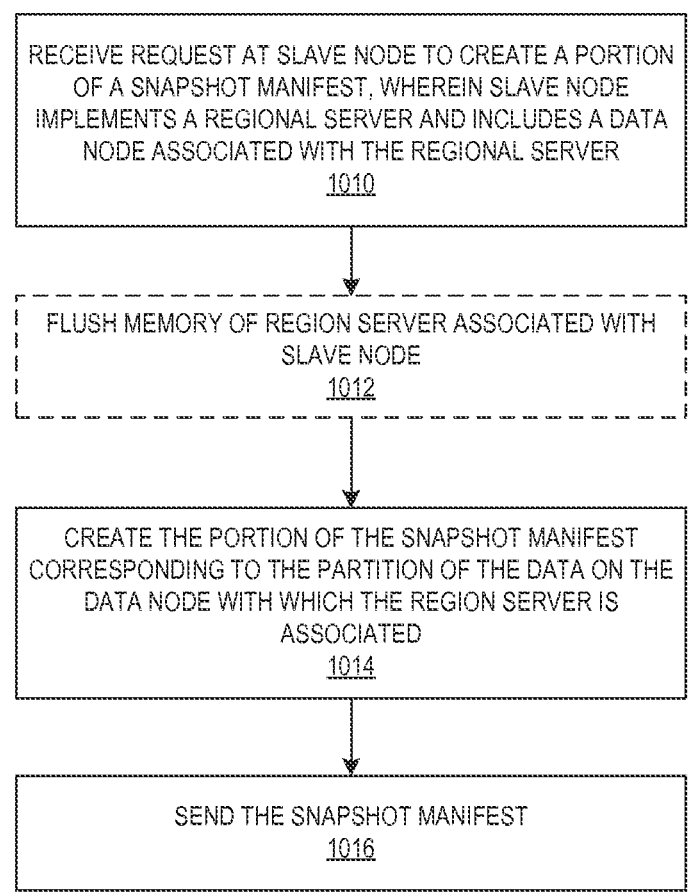
FIG. 10 is a flow diagram illustrating creation of a portion of a manifest-based snapshot of a data object in a distributed cloud-computing platform, according to an embodiment.

FIG. 10 is a flow diagram illustrating a set of operations 1000 for creation of a portion of a manifest-based snapshot of a data object in a distributed cloud-computing platform, according to an embodiment. More specifically, the set of operations 1000 illustrate creation of an example manifest-based snapshot in an online mode of operation. A slave machine such as, for example, slave machine 108 of FIG. 1 can, among other functions, perform the set of operations 1000.

To begin, at operation 1010, the slave machine (or slave node) receives a request to create a portion of a snapshot manifest. As described herein, the slave machine (or slave node) can implement a region server and include the data node associated with the region server.

At operation 1012, the slave machine (or slave node) optionally flushes the region server memory. For example, a log can be kept in memory until it is of a certain size at which point it is written out as an addenda as described herein. In some embodiments, flushing the memory results in the memory being written out to a persistent memory or log.

At operation 1014, the slave machine (or slave node) creates the portion of the snapshot manifest corresponding to the partition of the data on the data node with which the region server is associated. In some embodiments, creating the portion of the manifest-based snapshot corresponding to the partition of the data on the data node with which the region server is associated further comprises dropping a marker in a log file indicating a position of the log file associated with the snapshot manifest.

In some embodiments, the portion of the snapshot manifest comprises a single file including a listing of multiple file names in the portion of the snapshot manifest and reference information for locating the multiple files on the data node. In some embodiments, the portion of the snapshot manifest represents a single region.

Lastly, at operation 1016, the slave machine (or slave node) sends the snapshot manifest to another machine such as, for example, the master machine (or machine on which HDFS is controlled, e.g., NameNode).

As discussed herein, in some embodiments, the distributed cloud-computing platform is a Hadoop framework. In such cases, the master node can be an HBase master node, the slave nodes can be HBase slave nodes, and/or the data object can be a Hadoop table.

Figure 11:
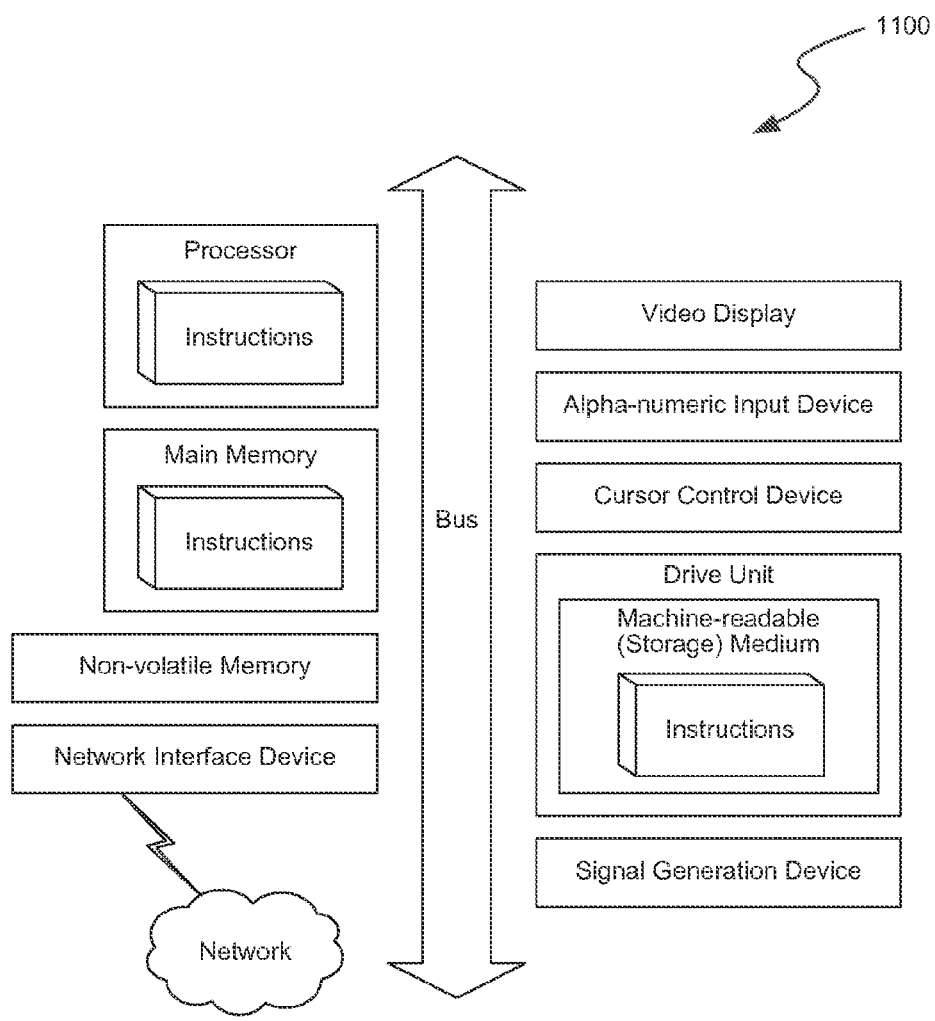
FIG. 11 depicts a diagrammatic representation of a machine, in the example form, of a computer system within which a set of instructions, for causing the machine to perform any one or more of the methodologies discussed herein, may be executed.

FIG. 11 shows a diagrammatic representation of a machine in the example form of a computer system within which a set of instructions, for causing the machine to perform any one or more of the methodologies discussed herein, may be executed.

In the example of FIG. 11, the computer system 1100 includes a processor, memory, non-volatile memory, and an interface device. Various common components (e.g., cache memory) are omitted for illustrative simplicity. The computer system 1100 is intended to illustrate a hardware device on which any of the components depicted in the example of FIG. 1 (and any other components described in this specification) can be implemented. The computer system 1100 can be of any applicable known or convenient type. The components of the computer system 1100 can be coupled together via a bus or through some other known or convenient device.

The processor may be, for example, a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer 1100. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium". A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to be part of the computer system. The interface can include an analog modem, ISDN modem, cable modem, token ring interface, satellite transmission interface (e.g. "direct PC"), or other interfaces for coupling a computer system to other computer systems. The interface can include one or more input and/or output devices, The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, it is assumed that controllers of any devices not depicted in the example of FIG. 11 reside in the interface.

In operation, the computer system 1100 can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may, thus, be implemented using a variety of programming languages.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine, While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure may be implemented as part of an operating system or a specific application, component, program, object, module or sequence of instructions referred to as "computer programs," The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are, at times, shown as being performed in series, these processes or blocks may instead be performed in parallel or may be performed at different times. Further, any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. §112, ¶6, other aspects may likewise be embodied as a means-plus-function claim, or in other forms, such as being embodied in a computer-readable medium. (Any claims intended to be treated under 35 U.S.C. §112, ¶6 will begin with the words "means for".) Accordingly, the applicant reserves the right to add additional claims after filing the application to pursue such additional claim forms for other aspects of the disclosure.

What is claimed is:

1. A computer implemented method of creating a manifest-based snapshot of a data object in a distributed cloud-computing platform, the method comprising:
   responsive to receiving a request to create a snapshot of the data object,
   identifying, by a master node of a distributed database system, multiple slave nodes of the distributed database system on which a data object is stored in the cloud-computing platform,
   wherein the distributed database system includes the master node and the multiple slave nodes,
   wherein each slave node implements a region server and includes a data node associated with the region server;
   creating a snapshot manifest representing the snapshot of the data object,
   wherein the snapshot manifest comprises a file including a listing of multiple file names in the snapshot manifest and reference information for locating the multiple files in the distributed database system,
   wherein creating the snapshot manifest further comprises directing each region server to create a portion of the snapshot manifest corresponding to the partition of the data on the data node with which the region server is associated,
   wherein directing each region server to create the portion of the snapshot manifest corresponding to the partition of the data on the data node with which the region server is associated comprises;
   generating, by the master node, a request to each region server for the respective portions of the snapshot manifest corresponding to the partition of the data on the data node with which the region servers are associate; and
   sending, by the master node, the requests to the corresponding region servers.

2. The computer implemented method of claim 1, further comprising:
   receiving the request to create a snapshot of the data object.

3. The computer implemented method of claim 1, further comprising:
   verifying, by the master node of a distributed database system, that the snapshot manifest is successfully or unsuccessfully created.

4. The computer implemented method of claim 1, wherein the data object is stored in partitions on multiple of the data nodes.

5. The computer implemented method of claim 4, wherein directing each region server to create the portion of the snapshot manifest corresponding to the partition of the data on the data node further comprises requesting that the region server flush memory prior to creation of the portion of the snapshot manifest.

6. The computer implemented method of claim 4, wherein directing each region server to create the portion of the snapshot manifest corresponding to the partition of the data on the data node further comprises directing each region server to drop a marker in a log the indicating a position of the log file associated with the snapshot manifest.

7. The computer implemented method of claim 4, wherein each portion of the snapshot manifest comprises a single file including a listing of multiple file names in the portion of the snapshot manifest and reference information for locating the multiple files on corresponding data nodes.

8. The computer implemented method of claim 4, wherein each portion of the snapshot manifest represents a single computing region.

9. The computer implemented method of claim 1, further comprising:
   receiving the respective portions of the snapshot manifest.

10. The computer implemented method of claim 9, wherein creating the snapshot manifest further comprises:
    combining the respective portions of the snapshot manifest to form the snapshot manifest.

11. The computer implemented method of claim 1, wherein the master node comprises an HBASE master node and the slave nodes comprise HBASE slave nodes.

12. The computer implemented method of claim 1, wherein the data object comprises a Hadoop table.

13. The computer implemented method of claim 1, wherein the distributed database system continues to accept reads and writes from clients during creation of the snapshot.

14. A distributed database system having a master node comprising:
   one or more processors;
   a memory unit having instructions stored thereon which, when executed by the one or more processors cause the master node to create a manifest-based snapshot of a data object in a distributed cloud-computing platform by:
      identifying multiple slave nodes of the distributed database system on which a data object is stored in the distributed cloud-computing platform, wherein the distributed database system includes the master node and the multiple slave nodes, wherein each slave node implements a region server and includes a data node associated with the region server:
   creating a snapshot manifest representing the snapshot of the data object, wherein the snapshot manifest includes a file including a listing of multiple file names in the snapshot manifest and reference information for locating the multiple files in the distributed database system,
      wherein creating the snapshot manifest further comprises directing each region server to create a portion of the snapshot manifest corresponding to the partition of the data on the data node with which the region server is associated,
      wherein directing each region server to create the portion of the snapshot manifest corresponding to the partition of the data on the data node with which the region server is associated comprises:
      generating, by the master node, a request to each region server for the respective portions of the snapshot manifest corresponding to the partition of the data on the data node with which the region servers are associated; and
      sending, by the master node, the request to the corresponding region servers.

15. The distributed database system of claim 14, further comprising a slave node configured to perform a method comprising;
   receiving, by the slave node of the distributed database system, a request to create the portion of the manifest-based snapshot from the master node of the distributed database system;
   responsive to the request, creating, by the slave node the portion of the manifest-based snapshot corresponding to the partition of the data on the data node with which the region server is associated.

16. The distributed database system of claim 15, the method the slave node configured to perform further comprising:
   prior to creation of the portion of the snapshot manifest, flushing memory of the region server.

17. The distributed database system of claim 15, the method the slave node configured to perform further comprising:
   sending the portion of the snapshot manifest corresponding to the partition of the data on the data node with which the region server is associated to the master node.

18. The distributed database system of claim 15, wherein creating the portion of the manifest-based snapshot corresponding to the partition of the data on the data node with which the region server is associated further comprises dropping a marker in a log file indicating a position of the log file associated with the snapshot manifest.

19. The distributed database system of claim 15, wherein the portion of the snapshot manifest comprises a single file including a listing of multiple file names in the portion of the snapshot manifest and reference information for locating the multiple files on the data node.

20. The distributed database system of claim 15, wherein the portion of the snapshot manifest represents a single region.

21. The distributed database system of claim 15, wherein the master node comprises an HBASE master node and the slave nodes comprise HBASE slave nodes.

22. The distributed database system of claim 15, wherein the data object comprises a Hadoop table.

* * * * *